UNITED STATES PATENT OFFICE.

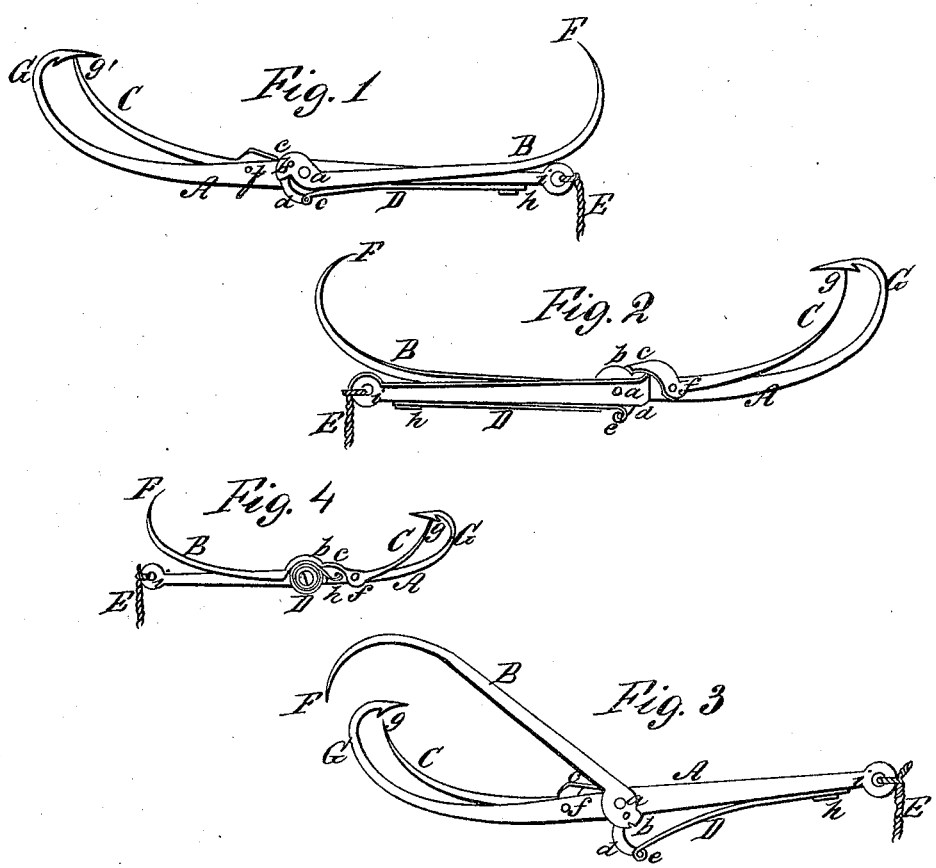

D. ELLIS AND C. T. GRILLEY, OF NAUGATUCK, CONNECTICUT.

IMPROVEMENT IN SPRING FISH-HOOKS.

Specification forming part of Letters Patent No. 5,709, dated August 15, 1848.

*To all whom it may concern:*

Be it known that we, DARWIN ELLIS and CHARLES T. GRILLEY, both of the town of Naugatuck, in the county of New Haven and State of Connecticut, have invented a new and useful Improvement in the Spring Fish-Hook; and we do hereby declare that the following is a full, clear, and exact description of the construction and operation of the same, reference being had to the accompanying drawings, which make part of this specification, in which—

Figure 1 is a perspective view of the spring fish-hook, showing the catch or dog which holds the striking-hook or gaff in its place when it is set for use. Fig. 2 is a perspective view of the opposite side of the same, showing the catch or dog more fully. Fig. 3 is a perspective view of the same, showing the catch or dog detached from the heel of the striking-hook or gaff, which is thrown down as in the act of striking the fish. Fig. 4 is a perspective view of a small hook of the same kind, showing the striking-hook or gaff as worked by a flat spring coiled in a spiral form, like the mainspring of a watch.

Our improvement consists in securing the striking-hook or gaff firmly in its position when set, by means of a catch or dog attached by means of a fulcrum-pin to the main bar of the hook, in such a manner that it will not be affected by the motion of a small fish or other small animal used as a live bait, nor by the weight of the hook and bait when casting the hook into the water, nor by the point of the baited hook catching against a stone or other hard substance at the bottom. Neither can a fish disengage the dog or catch so as to spring the hook by taking hold of the bait beyond the reach of the striking-hook or gaff; but when the fish has taken the point of the baited hook into his mouth, if he attempts to close his jaws he will press back the lever or extended part of the catch or dog, and thereby disengage the other end from the notch in the heel of the shaft of the striking-hook or gaff and allow the spring to throw down the striking-hook or gaff so as to secure the fish; or should the point of the baited hook penetrate a short distance into any part of the sides of the mouth of the fish, the same effect would be produced by the pressure of that part of the mouth on the lever end of the dog.

The main hook A, Figs. 1, 2, and 3, is made of a bar of steel of suitable size, and crooked sidewise in the middle, so as to form two curved projections and offsets, one on each side, as seen near $a$ and $d$, Fig. 2. The lower end of the bar is drawn out and formed into a barbed hook in the common form, as seen at G, Figs. 1, 2, and 3, and the upper end terminates in a hole or eye, $i$, Figs. 1, 2, and 3, to which the cord or line E is to be attached.

Two holes are made through the main bar, one above the curved projections and offsets at $a$, Fig. 2, where the striking-hook or gaff is to be attached by means of a fulcrum-pin, and the other below at $f$, Fig. 1, where the catch or dog is to be attached by means of a fulcrum-pin.

The striking-hook or gaff B, Figs. 1, 2, and 3, is made of steel, one end being drawn out and turned into a curve or hook with a sharp point, as seen at F, Figs. 1, 2, and 3, with or without a barb. The other end is made broad and flat, with the edge or heel convex on one side, as seen between $a$ and $b$, Fig. 1. A hole is made through this broad part at $a$, Figs. 1 and 3, by which it is attached to the main bar A by means of a fulcrum-pin, $a$, Figs. 1, 2, and 3, and another hole is made near $b$, Figs. 1 and 3, where, by means of a pin, it is connected with the circular lever or connecting-bar $d$, Figs. 1, 2, and 3, which connects it with the spring D, Figs. 1, 2, and 3. At this end of the shaft of the striking-hook or gaff, and on the convex edge or heel of the shaft at $b$, Figs. 1 and 3, is made a notch or space to receive the point of the catch when the hook is set; or any suitable projection may be made to answer the same purpose, if thought more convenient.

The spring D, Figs. 1, 2, and 3, is the common flat spring, made of the proper length and power, and is attached to the main bar by means of a mortise in the thick or stationary end of the spring, and a projection or hook on the back side of the main bar A, as seen at $h$, Figs. 1, 2, and 3, and the other end of the spring is connected with the lever or connecting-bar $d$ by means of a pin, $e$, as seen in Figs. 1, 2, and 3.

The catch or dog C, Figs. 1, 2, and 3, is made of steel, one end of which is drawn out and curved, as seen at C g, Figs. 1, 2, and 3, and operates as a lever, and the other end, c, is made flat, crooked, and bent over and beveled to an edge or point to fit the notch b, Figs. 1 and 3, in the heel of the shaft of the striking-hook or gaff B, Figs. 1, 2, and 3, as seen at c, Figs. 1, 2, and 3. Near the junction of the lever or extended part with the flattened part of the catch or dog C, Figs. 1, 2, and 3, and through the flat part at f, Fig. 2, a hole is made, by which it is attached to the main bar A by means of a fulcrum-pin, f, Figs. 1, 2, and 3. This catch or dog is attached to the main bar a little below the curved projections and offsets, (seen near a and d, Fig. 2,) and on the opposite side of the main bar from the striking-hook or gaff, and so situated that the point g of the lever or extended part shall reach near to and a little below the point of the barbed hook G, while the flattened end c bends over the crooked part of the main bar and reaches the notch b in the heel of the shaft of the striking-hook or gaff, as seen in Figs. 1, 2, and 3. The striking-hook or gaff B may then be drawn up against the upper part of the main bar A, and the beveled end c of the catch or dog C be inserted into the notch b in the heel of the shaft of the striking-hook, which will secure it in its place firmly and ready for use, as seen in Figs. 1 and 2. The hook G may then be baited and thrown into the water without any risk of detaching the striking-hook or gaff from its position.

When a fish bites he readily presses back the end g of the lever of the catch or dog, and thereby raises the point c of the catch or dog out of the notch b, when the spring D, acting on the connecting-lever d, brings down the striking-hook B to secure the fish, and will be as seen in Fig. 3.

The main bar A may be made straight, and the striking-hook B and dog C may be attached to the same side of the main bar A, and a flat or other spring, D, coiled in a spiral form, like the mainspring of a watch, may be attached to the side of the main bar A to work the striking-hook, as seen in Fig. 4; or the main bar A may be made straight and the striking-hook B and dog C placed on the same side of the main bar, and all the other parts used as before described and shown in Figs. 1, 2, and 3; or the striking-hook and dog, or either of them, may be inserted into a mortise, as the striking-hook is in Engelbrecht and Skiff's patent; or the parts may be made in any of the before-mentioned ways, or in any other convenient way, with a straight spring, as seen in Figs. 1, 2, and 3, or a coiled spring, as seen in Fig. 4, or a barrel or helical spring, as in Johnson's patent; but in all cases the striking-hook or gaff must be sustained in its position, when set, by a catch or dog attached to the main bar and extending to a point near to and a little below the point of the baited hook, and the other end resting in a notch or against a projection or in a hole at the heel of the shaft of the striking-hook, as seen, Figs. 1, 2, and 3; but we prefer, and would recommend to others, to make the whole as herein particularly described.

The advantages of our improvement over all others heretofore used consists in using a catch or dog attached to the main bar of the hook in such a manner as to secure the striking-hook or gaff firmly in its position when set for use. This catch or dog, having no connection with the line or cord, will not allow the hook to be sprung by the weight of the hook and bait when casting it into the water, nor by the movement of a live bait, nor by the point of the baited hook catching against a hard substance at the bottom, and therefore will only be sprung by the action of the fish's mouth, and then only when the fish is within the reach of the striking-hook or gaff.

All hooks now in use may be accidentally sprung by their own weight while casting them into the water, and this may happen without the knowledge of the fisherman, so that the bait may be taken off by a nibble, when there will be no possibility of catching the fish, and should the baited hook get fast at the bottom by any means a slight strain on the line or cord would spring the hook, and probably render it impossible ever to extricate it. To guard against such accidents we have invented our improvement.

By our improvement we also dispense with the slide as used in Engelbrecht and Skiff's patent, and also the lever used in Johnson's patent, while we make a much neater, safer, more useful, and economical article than either of them.

We do not claim any of the parts of the spring fish-hook as such; but

What we claim as our invention, and desire to secure by Letters Patent, is—

The application of a catch or dog attached by a fulcrum-pin to the main bar or shaft of the spring fish-hook in such a manner that when the hook is set one end of the catch or dog may rest in a notch or hole in or against a projection on the heel of the shaft of the striking-hook or gaff, so as to secure it firmly in its position, and not allow of its being sprung by any strain on the line or cord by either the weight of the hook and bait when casting it into the water or the motion of a live bait while in the water, and the other end in such a position near to and a little below the point of the baited hook as to allow the mouth of the fish readily to press it back and spring the hook, the whole constructed, arranged, and operating substantially as herein described.

DARWIN ELLIS.
CHARLES T. GRILLEY.

Witnesses:
R. FITZGERALD,
NEWTON WHEELER.